US005387302A

United States Patent [19]

Bernard et al.

[11] Patent Number: 5,387,302

[45] Date of Patent: Feb. 7, 1995

[54] METHOD OF AUTOMATICALLY AND CONTINUOUSLY LABELLING ARTICLES SUCH AS FRUIT OR VEGETABLES, AND APPARATUS FOR IMPLEMENTING THE METHOD

[75] Inventors: Jacques Bernard, Saint Philbert du Peuple; Laurent Koenig, Angers, both of France

[73] Assignee: DISPAC, Corne, France

[21] Appl. No.: 134,299

[22] Filed: Oct. 8, 1993

[30] Foreign Application Priority Data

Oct. 12, 1992 [FR] France ................................ 92 12455

[51] Int. Cl.[6] ........................ B32B 31/00; G05G 15/00

[52] U.S. Cl. .................................... 156/352; 156/538; 156/542; 156/574; 156/577; 156/DIG. 27

[58] Field of Search ............... 156/352, 538, 540, 541, 156/542, 574, 577, DIG. 27

[56] References Cited

U.S. PATENT DOCUMENTS

| | | | |
|---|---|---|---|
| 4,853,058 | 8/1989 | Riesmeier et al. | 156/577 X |
| 5,141,572 | 8/1992 | Gerber | 156/574 X |
| 5,170,698 | 12/1992 | Kirk | 99/472 |

FOREIGN PATENT DOCUMENTS

| | | |
|---|---|---|
| 0113256 | 7/1984 | European Pat. Off. . |
| 2383080 | 10/1978 | France . |
| 2442772 | 6/1980 | France . |
| 2033324 | 7/1972 | Germany . |

*Primary Examiner*—David A. Simmons
*Assistant Examiner*—Paul M. Rivard
*Attorney, Agent, or Firm*—Levine & Mandelbaum

[57] ABSTRACT

A method of automatically and continuously labelling articles such as fruit or vegetables. The method consists in placing said articles in indented trays having parallel rows of indentations, in disposing the trays in single file on a continuously moving conveyor, said rows being disposed perpendicularly to the advance direction of the conveyor, and in moving at least one labelling head over a row of indentations with composite rectilinear translation motion resulting from longitudinal advance motion corresponding to that of the conveyor combined with transverse motion such that a label is placed successively on each article in said row, and then in renewing said operation for each of said rows. The invention also provides apparatus for implementing the method.

8 Claims, 5 Drawing Sheets

METHOD OF AUTOMATICALLY AND CONTINUOUSLY LABELLING ARTICLES SUCH AS FRUIT OR VEGETABLES, AND APPARATUS FOR IMPLEMENTING THE METHOD

The present invention relates to a method of automatically and continuously labelling articles such as fruit or vegetables.

It also relates to apparatus for implementing the method.

BACKGROUND OF THE INVENTION

In the fruit trade, and to a lesser extent in the vegetable trade, a present trend consists in placing a small adhesive label thereon in preparation for subsequent sale, the label mentioning, for example, the variety of the fruit, its country or region of origin, or else a trademark.

This applies in particular to selling apples.

Until now, to label apples automatically, wide use has been made of labelling machines sold by the firm SINCLAIR. A labelling machine of this type is described in Document EP-A-0 113 256 and the content thereof is considered as forming an integral portion of the present application.

Such a labelling machine essentially comprises a reel having a strip of label-supporting material wound thereon. It also includes means suitable for unsticking the labels one by one and transferring them to a labelling head. The labelling head is rotary and includes a plurality of elastically deformable studs in the form of a bellows through which suction can be applied. When a label is unstuck from the supporting material, it is taken so that its non-adhesive side is pressed against a stud which is under suction. When the stud comes over a fruit to be labelled, suction is interrupted and the label sticks on the fruit.

It has become the practice to label apples before they are sorted as a function of color, appearance, or size. After sorting, the apples are packaged, generally by being placed on trays having indentations which are then placed in cardboard packing cases.

One method of labelling consists in causing the apples to pass onto an endless conveyor belt prior to being sorted, with there being elements disposed on the belt suitable for organizing the flow of fruit into a series of parallel rows. A labelling machine of the above-specified type is provided for each row, and is itself secured to the framework of the conveyor belt.

That method of proceeding presents several drawbacks.

Firstly, all of the fruit are labelled even though some of them, e.g. damaged fruit, will not complete the usual sequence of packaging and sale, and as a result have no need to be labelled.

Secondly, when the fruit come under the labelling machines, they are disposed in entirely random orientations. Consequently, about 30% of the labels are badly placed, e.g. on the stalk of an apple, from which they quickly become unstuck, prior to packaging.

OBJECTS AND SUMMARY OF THE INVENTION

The present invention seeks to provide a labelling method enabling those drawbacks to be mitigated.

It is applied only to fruit that are indeed going to be packaged. In addition, the method makes it possible to label the fruit properly, without any risk of the labels being badly positioned or of them quickly becoming unstuck.

Finally, the method makes it possible to increase the rate at which fruit are labelled quite considerably.

These results are achieved by the fact that this method of automatically and continuously labelling articles such as fruit or vegetables, consists in placing said articles in indented trays having parallel rows of indentations, in disposing the trays in single file on a continuously moving conveyor, said rows being disposed perpendicularly to the advance direction of the conveyor, and in moving at least one labelling head over a row of indentations with composite rectilinear translation motion resulting from longitudinal advance motion corresponding to that of the conveyor combined with transverse motion such that a label is placed successively on each article in said row, and then in renewing said operation for each of said rows.

In addition, in a particular implementation, the method includes the fact that a plurality of labelling heads are displaced together, with the distance between two adjacent heads being the same as the distance between two corresponding rows in two adjacent indented trays.

The invention also relates to apparatus for implementing the method.

The apparatus is remarkable by the fact that it comprises a frame extending over the continuously moving conveyor that is suitable for receiving in single file the indented trays having parallel rows of indentations, each indentation having an article placed therein, the rows being disposed perpendicularly to the advance direction of the conveyor, the apparatus also including a first carriage suitable for being displaced longitudinally over the conveyor, and in that the first carriage carries a second carriage that carries at least one labelling head and that is suitable for being displaced along the first carriage transversely relative to the conveyor.

Other, non-limiting but advantageous characteristics of the apparatus are as follows:

- said first carriage moves along rails provided on the frame;
- the second carriage is secured to at least one belt that is moved by means of pulleys, at least one of which is motor-driven, said pulleys being secured to rotary shafts carried by the first carriage;
- it includes means for simultaneously controlling the displacement of the first carriage and of the second carriage; and
- said means is constituted by numerical control means.

BRIEF DESCRIPTION OF THE DRAWINGS

Other characteristics and advantages of the invention appear from the following description and the accompanying drawings which show a preferred embodiment of apparatus in accordance with the invention.

In the drawings.

MORE DETAILED DESCRIPTION

Figure 1:
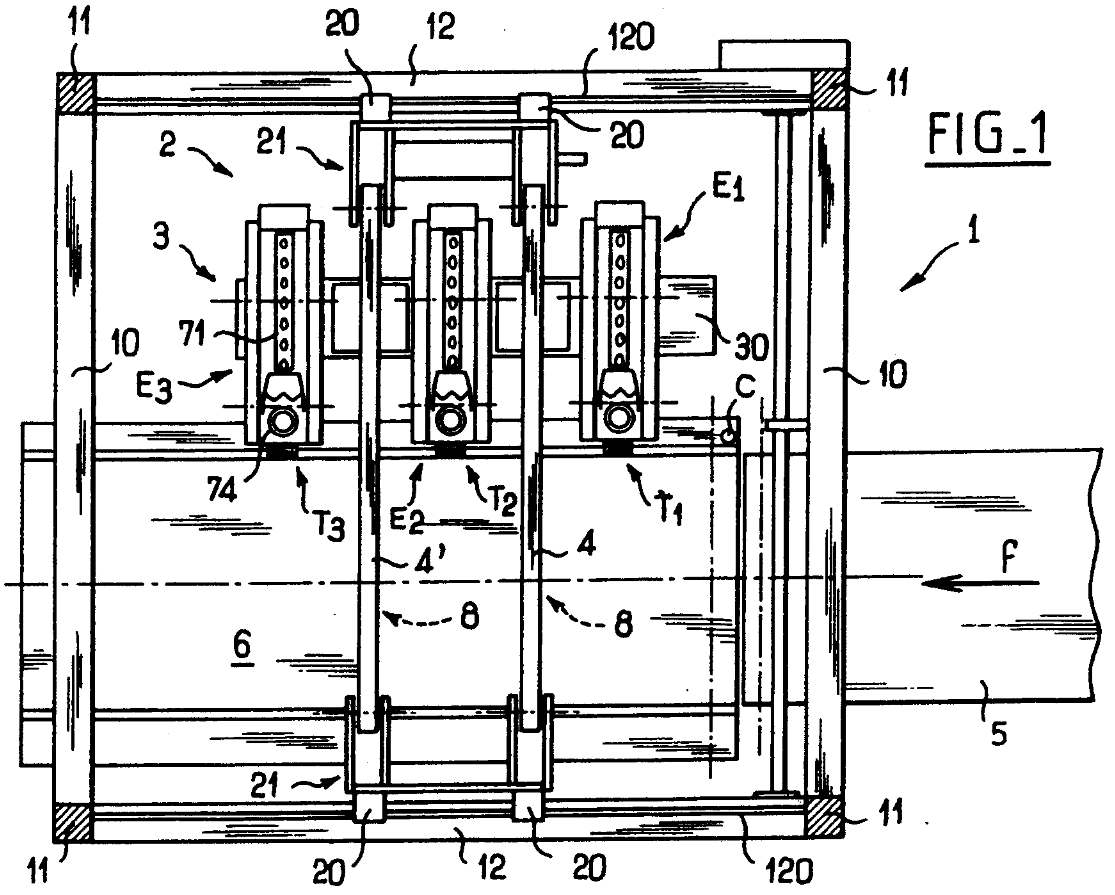
FIG. 1 is a diagrammatic plan view, partially in section, of labelling apparatus of the invention.
Figure 3:
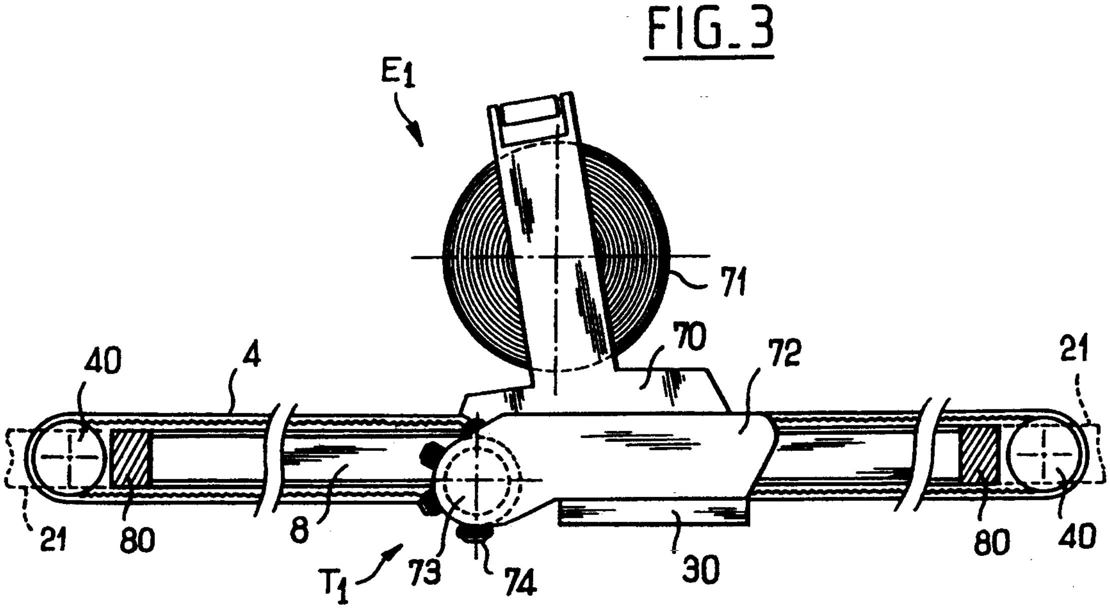
FIG. 3 is a side view of a portion of the apparatus.
Figure 4:
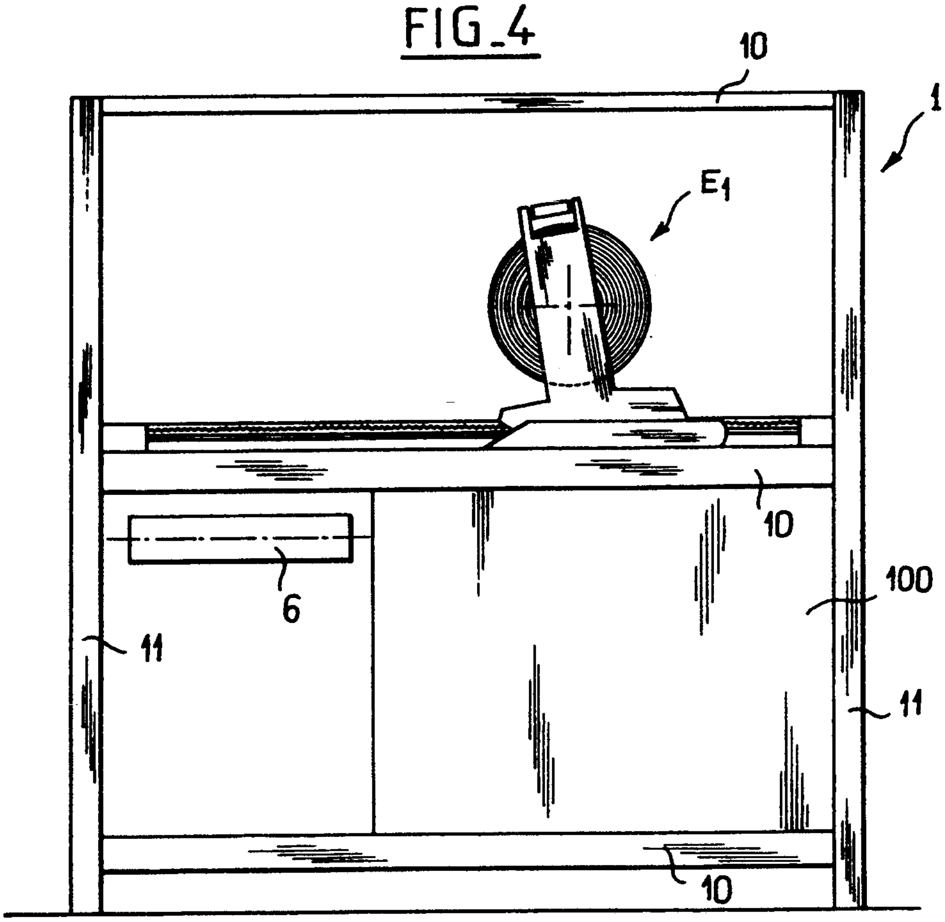
FIG. 4 is a diagrammatic side view of the FIG. 1 apparatus.
Figure 5:
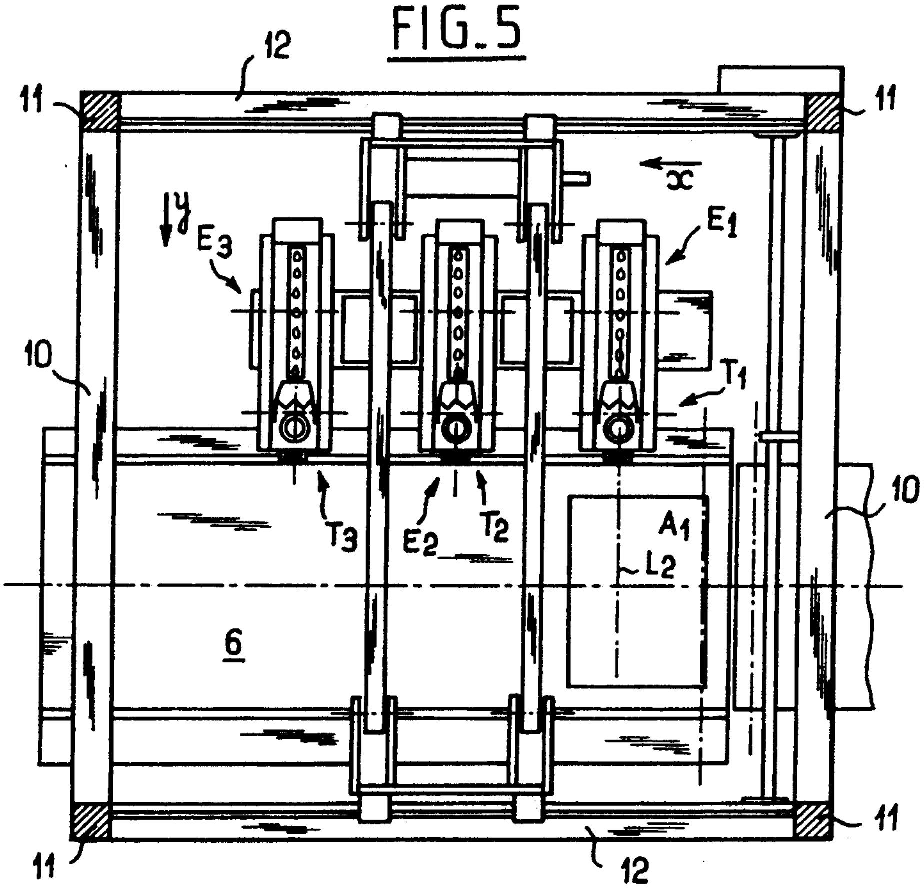
FIGS. 5, 6, 7, 8, and 9 are plan views of the apparatus of the invention, some of the views being fragmentary, serving to illustrate the labelling of apples disposed on a plurality of indented trays.
Figure 6:
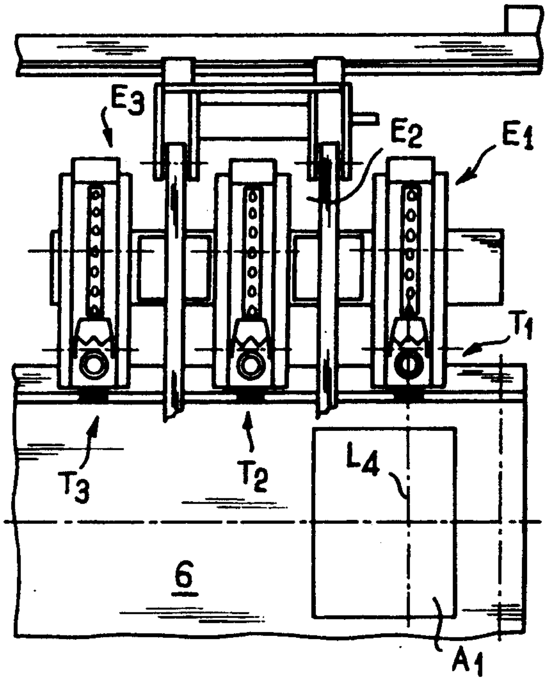
Figure 7:
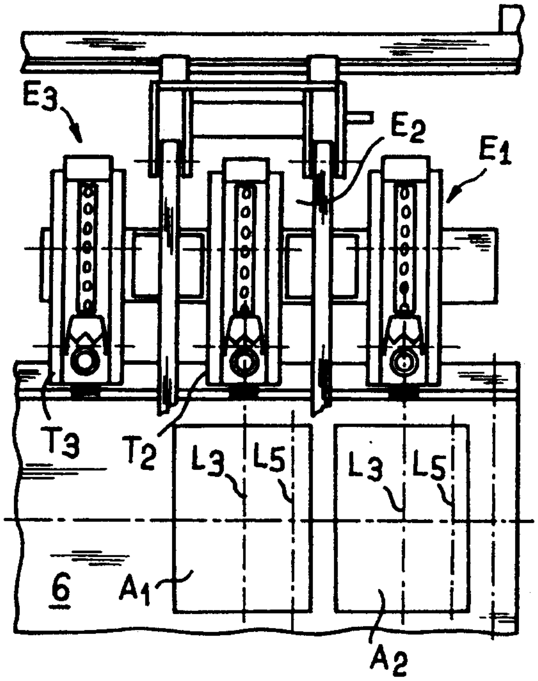
Figure 8:
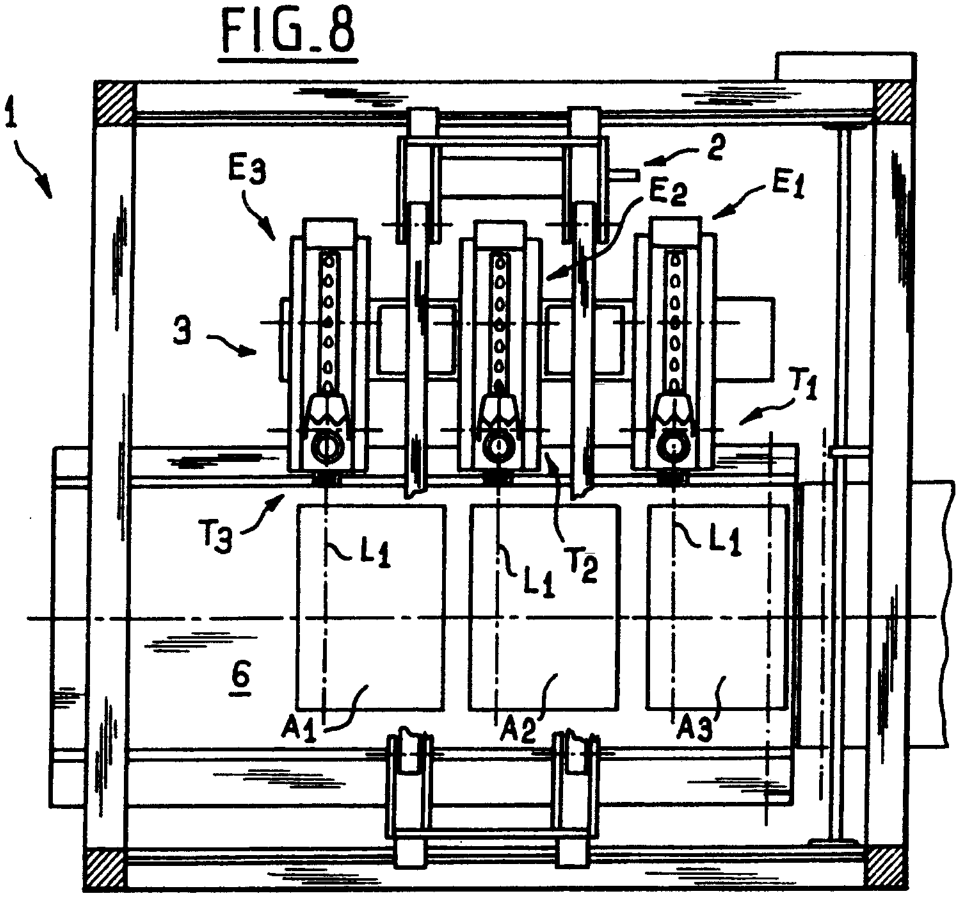
Figure 9:
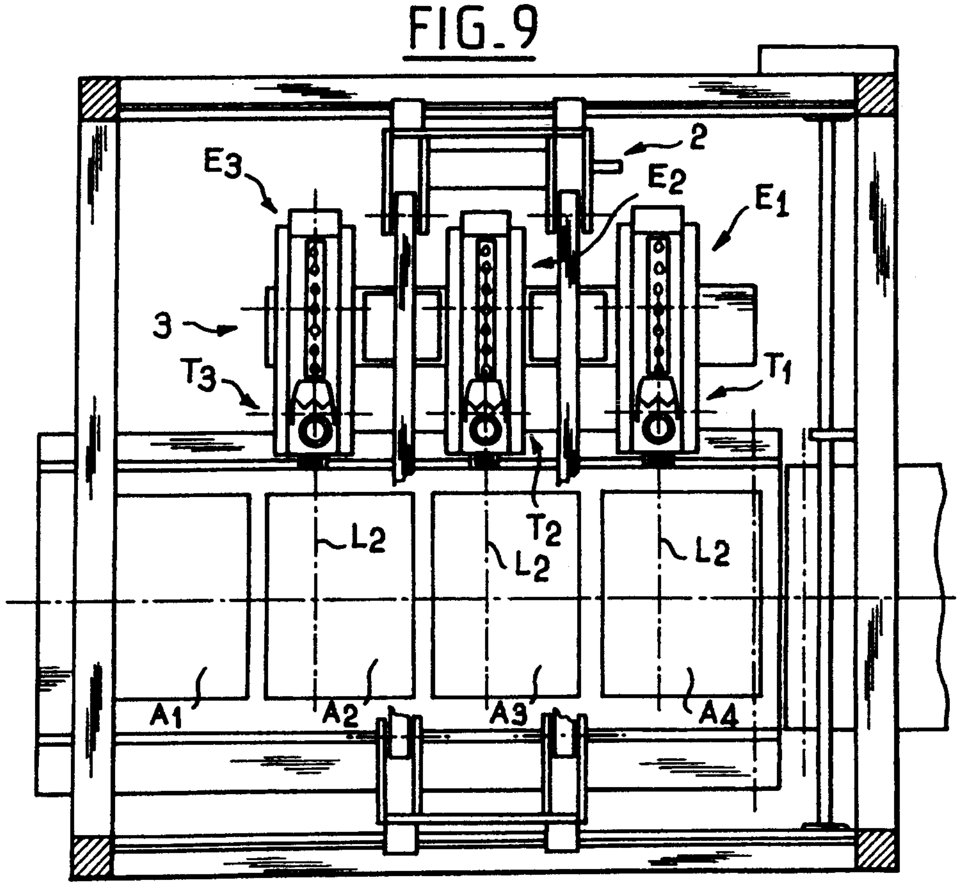

The apparatus enabling the method of the present invention to be implemented is more particularly visible in FIGS. 1, 3, and 4.

The apparatus comprises a frame 1 that is substantially in the form of a rectangular parallelipiped.

It comprises an assembly of hollow metal bars 10, 11, and 12, e.g. aluminum extrusions. The bars 11 are vertical and extend between four pairs of vertices of the parallelipiped. On the two long sides of the frame, the bars 11 are interconnected by horizontal bars 12. There are three bars 12 per side disposed respectively near the top, near the bottom, and substantially halfway up the bars 11. In similar manner, each of the two short sides of the frame have three horizontal transverse bars 10.

As can be seen in FIGS. 1 and 4, an endless conveyor belt 6 is disposed inside the frame immediately below the bars 10 that are halfway up the frame. The conveyor extends longitudinally and its upstream end preferably receives articles from another endless conveyor 5 disposed in line with it.

Longitudinal rails 120 are placed on the top faces of the bars 12 that are situated halfway up the frame. A carriage 2 is mounted to run on these rails by means of wheels 20. The wheels 20 are secured to end portions 21 of the carriage which are constituted by assemblies of small metal bars. Between these two end portions 21 there extend two parallel transverse bars 8 (visible in FIG. 3) themselves connected to longitudinal bars 80 which are secured to the end portions 21. Means (not shown), such as an electric motor, enable the carriage 2 to be moved longitudinally, i.e. along the rails 120.

At opposite ends of the bars 80, there are pulleys 40 carrying respective belts 4 and 4 '. The pulleys 40 are of a diameter that is slightly greater than the thickness of the bars 8 and 80 such that the rectilinear portions of these belts extend over and under the top face and the bottom face of said bars. The belts therefore extend transversely relative to the frame 1. The shafts on which the pulleys are secured are mounted on the carriage 2 and drive means such as an electric motor enable one of the pulleys to be rotated.

These belts are preferably cog belts and are made of a plastics material that is reinforced with metal fibers.

A second carriage 3 has a baseplate 30 fixed to the bottom length of each of the belts 4 and 4 '. The baseplate 30 is rectangular and extends in the longitudinal direction of the frame.

This baseplate carries three labelling machines E1, E2, and E3 of the same type as described above, i.e. in accordance with Document EP-A-0 113 256.

The carriage 3 includes wheels (not shown) that are mounted free to rotate and that run along the side faces of the cross-bars 8. The section of the bars 8 is appropriate for receiving the wheels and for carrying a fraction of the forces generated by the weight of the labelling machines. Thus, the weight of the three labelling machines is supported in part by the baseplate 30 but also in part by the carriage 2.

All three labeling machines are of the same type, and FIG. 3 shows one of them. The labelling machine comprises a stand 70 which receives a reel 71 of support material carrying the adhesive labels that are to be issued. It also includes a bottom portion 72 having a labelling head formed by a cylinder 73 with a series of bellows studs 74 around its periphery. As explained above, means are provided for unsticking labels one by one from the strip of support material 71 and for transferring them to the studs 74.

The labelling machines E1, E2, and E3 are mounted on the carriage 3 at constant mutual spacing.

As shown in FIG. 4, the periphery of the frame, in its bottom half, is covered by opaque plates 100 that act as protective cladding. Such cladding is not provided in the zone through which the conveyor 6 passes.

The top portion of the frame, i.e. the portion that is disposed around the labelling machines, may be protected by sliding windows.

Figure 2:
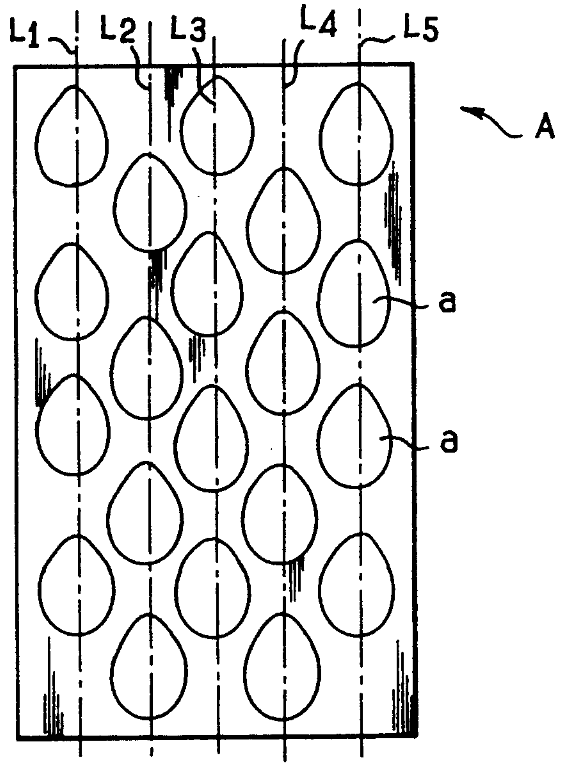
FIG. 2 is a plan view of an indented tray usable in the context of the present invention.

FIG. 2 is a diagram showing a conventional indented tray suitable for receiving fruit such as apples. This indented tray A is rectangular in shape and is made of a synthetic material such as polystyrene. The indentations a that it includes extend along five lines or rows that extend parallel to the long sides of the tray. From left to right in the figure, these rows are respectively referenced L1, L2, L3, L4, and L5. Each row has four indentations a. As can be seen in the figures, the various indentations are disposed in a mutually staggered configuration.

In order to be able to implement the labelling method of the present invention, the apparatus is fitted with numerical control means for controlling simultaneous displacement of the two carriages 2 and 3. Such numerical control means may be constituted, by a NUM 820 REFLEX microprocessor sold by the firm TELEMECANIQUE.

The first step of the method of the invention consists in placing the articles to be labelled in the indented trays. We will assume that the articles are apples. As mentioned above, the apples are sorted, as a function of appearance or size. The apples are thus disposed one by one in respective indentations a in the trays of the type described above.

The trays are then placed in a single file on the conveyor 5 mounted at the upstream end of the apparatus, and moving them in the direction of arrow f. As they move, the trays are picked up by the conveyor 6 which moves them at the same speed as the conveyor 5. This speed of advance may lie in the range 0 to 12 meters per minute.

The trays are disposed at equal intervals so that the spacing between corresponding rows in two adjacent trays is the same as the spacing between two adjacent labelling heads. As an example, the width of a tray may be 300 mm and the spacing between two successive trays may be 50 mm.

The trays A are placed on the conveyor so that the rows L1 to L5 extend perpendicularly to the travel direction of the conveyors 5 and 6.

The final step of the method consists in displacing at least one labelling head over a row of an indented tray by imparting composite rectilinear translation motion thereto comprising longitudinal advance motion matching that of the conveyor 6, combined with transverse motion perpendicular to said advance motion so as to place successive labels on each of the apples in the row, and then repeating this operation for each of the rows.

Figure 10:
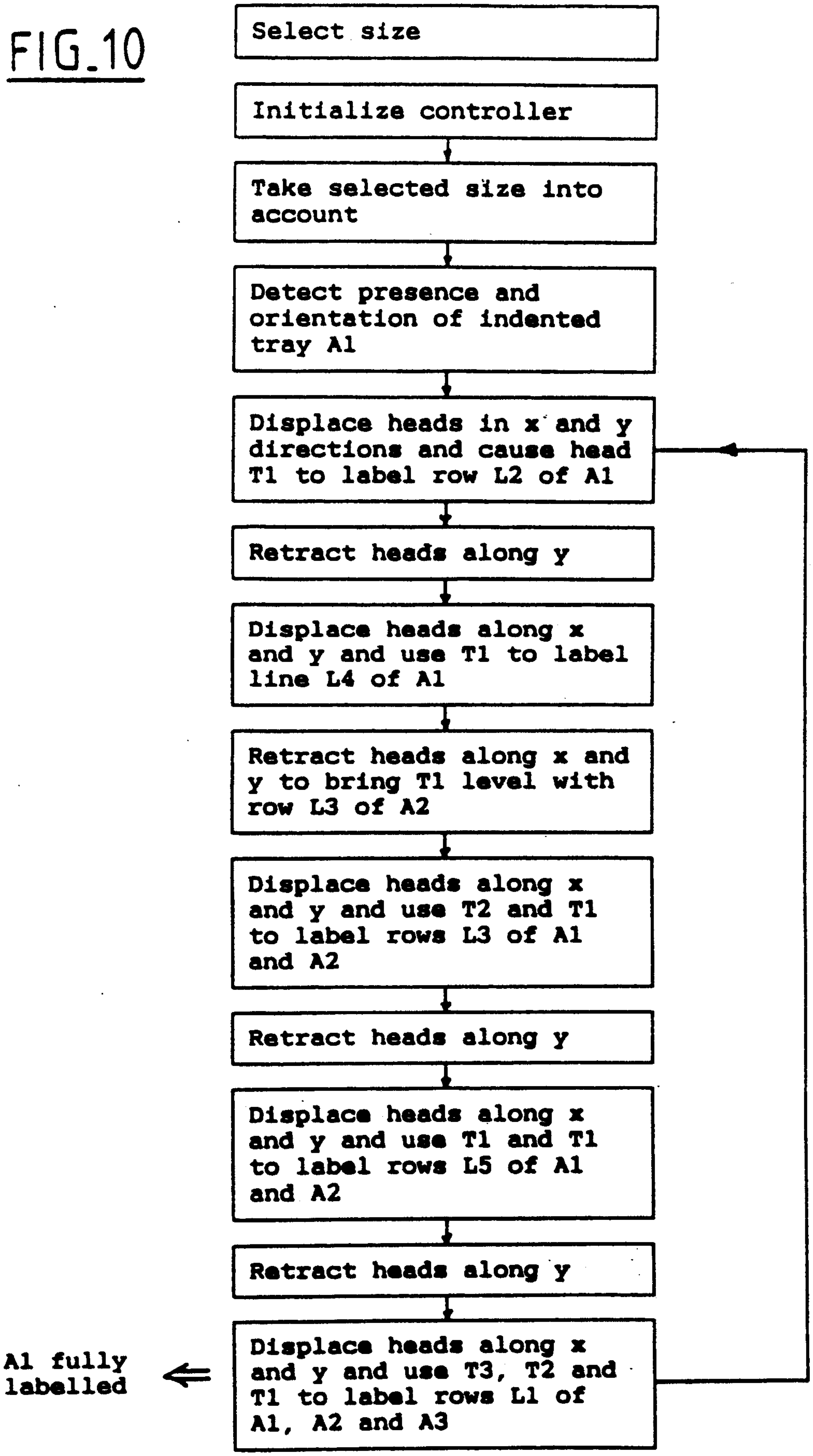
FIG. 10 is a flow chart showing the main steps in the operation of the apparatus of the invention.

This final step of the method is described in detail below. This description refers to the flow chart of FIG. 10 specifying the main operating steps of the apparatus.

In a first step, the size of the indented trays is initially selected for the numerical control means, i.e. the dimensions of the trays and the number of rows they have. Indented trays come in several different sizes, for example trays having four, five, or six rows of indentations. Once this selection has been made, the numerical control means initializes the carriages 2 and 3, i.e. it positions them in reference positions referred to as "origin" positions.

In the description below, the x-direction is taken to mean the displacement direction of the carriage 2 along the rails 120, and the y-direction corresponds to the displacement of the carriage 3 relative to the carriage 2.

After it has been initialized, the numerical control means takes the selected size into account.

A cell C placed on the conveyor 6, e.g. a photocell, detects the presence of a first indented tray A1 at the upstream end of the conveyor 6. The cell also detects whether a fruit is present or not on the corner of the tray nearest thereto. This detection is necessary because of the staggered configuration of the fruit disposed in the indentation.

The numerical control means then causes the carriages 2 and 3 to move simultaneously in the directions of arrows x and y so that the head T1 of labelling machine E1 labels fruit in row L2 of tray A1. The head T1 thus moves with composite rectilinear motion resulting from longitudinal advance motion corresponding to that of the conveyor 6 combined with transverse motion relative to the conveyor.

The longitudinal advance motion of the carriage 2 takes place at the same speed as the advance motion of the conveyor 6, and the displacement of the carriage 3 takes place at a speed of the order of 800 millimeters per second to 1,000 millimeters per second.

Once the fruit in row L2 have all been labelled, the numerical control means causes the carriage 3 to be withdrawn in the opposite direction to arrow y, while the carriage 3 continues to move in the direction of arrow x. The head T1 is then at the end of row L4 which it ten labels in turn.

Once this operation has been performed, the numerical control means causes the carriages 2 and 3 to move simultaneously in the directions opposite to arrows x and y.

The row L3 of tray A1 is thus to be found at this moment in association with labelling head T2. Similarly, row L3 of tray A2 disposed immediately behind tray A1 is level with the head T1 of labelling machine El. These two rows are then labelled simultaneously. The numerical control means then causes the labelling machines to withdraw in the opposite direction to arrow y and subsequently causes the rows L5 of the two above-mentioned trays to be labelled.

The labelling machines then withdraw again so as to come level with rows L1 in three trays A1, A2, and A3.

These rows are then labelled, and the apparatus is in a situation where all of the fruit on tray A1 have been labelled. The process is then repeated for rows L2 of trays A2, A3, and A4 in the same manner as that explained above for tray A1, and so on for the other rows.

Naturally, depending on the number of rows of indentations in the indented trays, and also depending on the number of labelling machines carried by the carriage 3, the flow chart governing sequencing of the apparatus needs to be adapted so as to ensure that all of the rows of indentations are labelled.

In a variant embodiment, the indented trays that receive the fruit are themselves placed in shallow boxes e.g. of wood or cardboard, of the type generally used for selling fruit. The method of the invention is then implemented by placing the shallow boxes in single file on the conveyor.

The boxes may carry bar code information on at least one wall, e.g. specifying the number of rows in the indented tray contained in the box. Naturally, the labelling apparatus is then provided with means for reading such bar codes. As a function of the information read, the numerical control means automatically organizes labelling.

We claim:

1. A method of automatically and continuously labelling articles such as fruit or vegetables, which method consists in placing said articles in indented trays having parallel rows of indentations, in disposing the trays in single file on a continuously moving conveyor, said rows being disposed perpendicularly to an advance direction of the conveyor, and in moving at least one labelling head in a first direction parallel to said direction at a velocity equal to that of the conveyor, and in a second direction perpendicular to said advance direction over a row of indentations such that a label is placed successively on each article in said row, and then in renewing said operation for each of said rows.

2. A method according to claim 1, wherein said trays are themselves placed in shallow boxes.

3. A method according to claim 1, including the step of simultaneously displacing a plurality of labelling heads, with the distance between two adjacent heads being the same as the distance between two corresponding rows in two adjacent indented trays.

4. Apparatus for automatically and continuously labeling articles such as fruit or vegetables, the apparatus comprising a frame extending over a continuously moving conveyor that is suitable for receiving in single file indented trays having parallel rows of indentations, each indentation having an article placed therein, the rows being disposed perpendicularly to an advance direction of the conveyor, the apparatus also including a first carriage suitable for being displaced longitudinally over the conveyor, and in that the first carriage carries a second carriage that carries at least one labelling head and that is suitable for being displaced along the first carriage transversely relative to the conveyor.

5. Apparatus according to claim 4, wherein said first carriage moves along rails provided on the frame.

6. Apparatus according to claim 4, wherein the second carriage is secured to at least one belt that is moved by means of pulleys, at least one of which is motor-driven, said pulleys being secured to rotary shafts carried by the first carriage.

7. Apparatus according to claim 4, including means for simultaneously controlling the displacement of the first carriage and of the second carriage.

8. Apparatus according to claim 7, wherein said means is constituted by numerical control means.

* * * * *